March 29, 1966 R. A. CRANE 3,242,794

PHOTOMETRIC LIQUID LEVEL DETECTOR

Filed March 3, 1960

INVENTOR.
Robert A. Crane
BY
Griswold & Burdick
ATTORNEYS

United States Patent Office

3,242,794
Patented Mar. 29, 1966

3,242,794
PHOTOMETRIC LIQUID LEVEL DETECTOR
Robert A. Crane, Concord, Calif., assignor to The Dow Chemical Company, Midland, Mich., a corporation of Delaware
Filed Mar. 3, 1960, Ser. No. 12,584
3 Claims. (Cl. 88—14)

This invention relates to a liquid level detecting device and more particularly to a new and novel means for accurately and automatically observing the position of liquids by photoelectric means.

There are many visual, electrical and photoelectrical systems reported in the prior art for detecting variations in the height of a liquid column. For example, visual observation of a liquid meniscus, photoelectric observation of light passing through a liquid column, interruption or absorption of a light beam by a liquid column and electrical contacts mounted in the path of a liquid are but a few of the liquid detecting means that have been used.

Although the various prior art systems have certain advantages, generally each possesses one or more inherent disadvantages. To illustrate, visual observation lends itself to errors in reading because of the human factor. Most photoelectric systems are relatively insensitive and are applicable primarily to colored or opaque liquids. Systems dependent on electrical contacts cannot be used with combustible materials. Now unexpectedly the disadvantages of these measuring systems have been overcome by the measuring means of the present invention wherein an improved, sensitive, photometric determination of liquid levels is achieved by sensing the light reflected from a solid-gas interface above a liquid column.

Accordingly, it is a principal object of the present invention to provide an improved photometric means for determining liquid levels. It is another object of this invention to provide a simple but sensitive photoelectric means of detecting liquid levels which is independent of the transparency of the liquid being measured. It is a further object of the present invention to provide a photometric liquid level measuring means in which the light source and light sensing means are not mounted coaxially so that incident transmitted light plays no part in the activation of the light sensing means. An additional object of this invention is to provide a means for determining a precise time at which the end of a liquid column passes a predetermined point.

Other objects and advantages of the invention will be apparent and the invention will be understood by reference to the specification presented hereinafter and to the accompanying figures wherein similar characters of reference represent corresponding parts in each of the several views.

Figure 1:
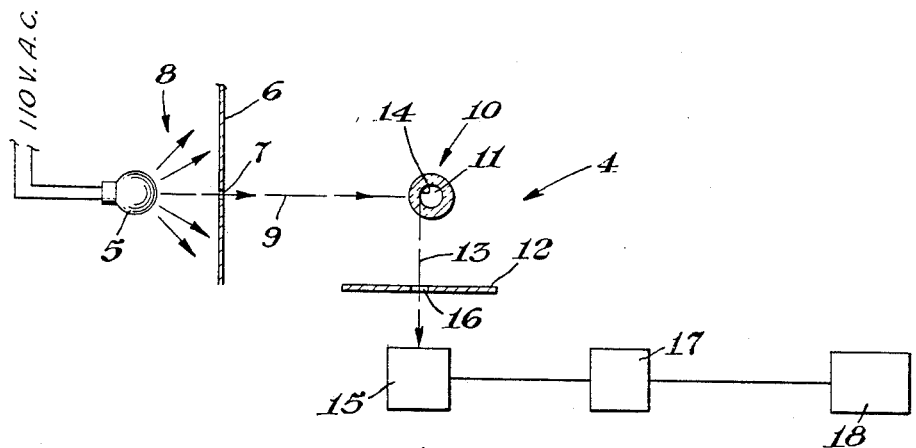
FIGURE 1 is a top elevation, diagrammatical view of a liquid level detector means of this invention.

In FIGURE 1 there is disclosed an embodiment of a photometric liquid level indicating device 4 of this invention. A light source 5, such as an incandescent bulb is provided. A light ray scatter limiting or divergence minimizing means 6, having a slit opening 7, is positioned in the path of the multiplanar light beam 8 issuing from the light source 5 so that a substantially parallel beam of incident light 9 emerging from the slit 7 strikes a tubular, transparent holder 10 for a liquid column 11. A second light ray scatter limiting or divergence minimizing means 12 is positioned at an angle from the light source 5 to the side of the liquid holder 10 in the plane of the light beam 13 reflected at a preselected height from the inner wall 14, facing the light source 5, of the liquid holding chamber of the liquid holder 10. A photosensitive light detector 15, such as a photoelectric cell, is positioned to receive the beam 13 reflected at the preselected height, as determined by the position of the light source, photo-sensitive light detector 15 and light ray scatter control means 6 and 12, from the holder 10 after this beam has passed through the slit 16 of the second light ray scatter control means 12. A conventional electronic voltage amplifier 17 is connected to the light detector 15 to receive its electrical output and this amplifier 17 in turn is coupled to a conventional signalling, controlling or reading means 18 such as an electrical output indicator, recorder or other apparatus required by the system wherein the liquid level detector device is installed.

Figure 2:
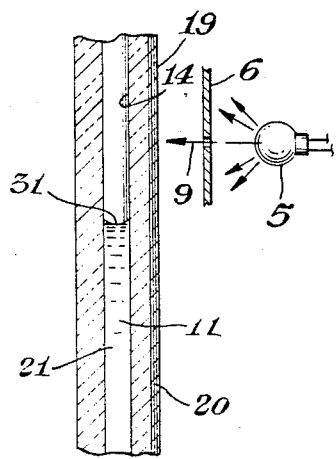
FIGURE 2 is a front elevation, fragmentary view of the apparatus of FIGURE 1 partially cut-away, wherein the transparent liquid holder contains a liquid column having a concave meniscus.

FIGURE 2 represents diagramatically the pattern of light reflectivity of cylindrical liquid holder 10 placed in vertical position. As the substantially parallel light beam 9 strikes the outer wall 19 of the holder 10 nearest the light source 5, this light beam is reflected by the solid-gas interface at the outer wall as well as by the near inner wall surface 14 above a liquid column 11 as bright light reflection 20 as indicated by the corresponding thick lines in FIGURE 2. Correspondingly the markedly reduced intensity of reflectivity at the solid-liquid interface 21 on the front inner wall surface 14 is indicated by the corresponding narrow line.

Figure 3:
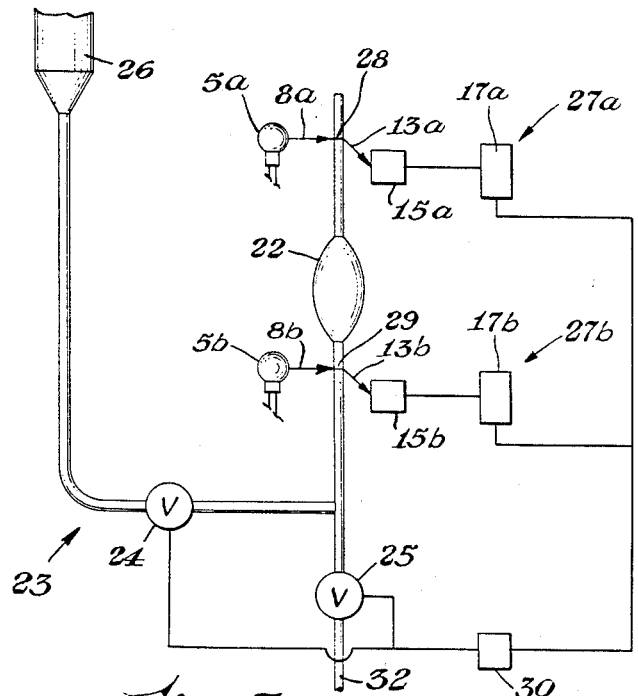
FIGURE 3 is a diagrammatical view showing an assembly set up to give automatic delivery of repeated volumes of liquid using a modification of liquid level detecting devices of this invention.

FIGURE 3 shows the detecting apparatus 4 of this invention utilized with a pipette 22 in an assembly 23 whereby there are delivered automatically repeated accurately reproduced volumes of liquid by electromechanical control of a supply valve 24 and a delivery valve 25. In this system, a liquid reservoir 26 is connected through supply valve 24 to pipette 22. A photometric liquid level detector device 27a of this invention having modified electronic circuitry is positioned so that the photo-sensitive detecting means 15a scans the light reflected at the top volume indicating mark 28 of the pipette 22. A second similar liquid level detector means 27b is positioned to scan light reflected at a lower volume indicating mark 29 on the pipette 22. A delivery valve 25 is connected to the pipette near its lower end. The two photometric liquid level detecting assemblies 27a and 27b in turn are coupled through their respective amplifiers 17a and 17b to a conventional relay assembly 30 designed to activate the supply and delivery valves 24 and 25.

In utilizing the photometric liquid level detecting apparatus 4 of the present invention, the light source 5, light ray scatter limiting means 6 and 12, and a photoelectric cell as the photo-sensitive light detecting means 15, are positioned so that the cell and light source 5 are not coaxial. However these members are fixed in such a manner that incident collimated, substantially parallel light 9 reflected from a preselected height at the inner wall 14 of a circular, tubular liquid filled holder 10 strikes the photoelectric cell. The response of the cell to the low-intensity, reflected light 21 from the solid-liquid interface at this inner wall is noted. As the liquid column 11 is withdrawn from the holder 10, and the meniscus 31 crosses the path of the beam 9 incident to the photoelectric cell at the preselected height, the intensity of the reflected beam 13 markedly increases. The photoelectric cell senses this intensity change and feeds this as electrical output to the amplifier 17 whose output in turn feeds into a signalling, a reading or controlling means 18.

Alternatively, the reflected light intensity from the gas-solid interface above a liquid column at a preselected height on the liquid holding chamber can be noted, and the corresponding decrease in electrical output by the photosensitive detector as the liquid column crosses this line and presents a liquid-solid interface to the light, also can be used to measure the height of a liquid column.

A practical application using the instant liquid level detecting means is exemplified by the modifications utilized in the fluid delivery system shown in FIGURE 3. Two liquid level detecting devices, 27a and 27b are connected through an electrical relay 30 to a solenoid operated supply valve 24 and a solenoid operated delivery valve 25. In operation, liquid from the pipette 22 is delivered through delivery tube 32 at the bottom of the pipette 22 through the open delivery valve 25, the supply valve 24 being closed, until the liquid level reaches the lower volume indicating mark 29. As the liquid crosses this line, the change in reflectively noted by the photo-sensitive means, transformed into electrical output, activates the relay 30, which in turn closes the delivery valve 25 and opens the supply valve 24. This action permits liquid to flow by gravity from the reservoir 26 and fill pipette 22. As the liquid column reaches the upper volume indicating mark 28, the change in reflectivity noted by the upper photo-sensitive liquid level detector 27a is now transmitted to the relay as a change in electrical output, the relay this time closing supply valve 24 and opening delivery valve 25, just the reverse as was accomplished by the lower liquid level detecting device 27b.

Preferably a photoconductive cell will be utilized as the photo-sensitive light detecting means in the apparatus of this invention, although other photoelectric devices such as photovoltaic cells, photomultiplier tubes and the like can be employed.

Light ray divergence minimizing or scatter limiting means are those conventionally used in optical assemblies. These are used in the present device to reduce the effects of stray light on the sensing means, and it is understood that under certain conditions, these will not need to be used. The prime purpose of the light ray scatter reducing between the light source and the liquid holder is to reduce the amount of non-parallel light beams striking the transparent holder as well as to prevent scattering of the incident light. The light ray scatter reducing means between the liquid holder and the liquid sensing means reduces interference from undesirable reflections both from the outer wall of the holder and from the liquid meniscus incident on the sensing device.

Although a circular, tubular, liquid holding means is shown in the presently described embodiments, in utilizing the reflection technique of detection in this apparatus it is necessary that only the front wall of the liquid holding chamber be curved as the measured reflection is that of the interface of this wall and the substance in the liquid holding chamber. Therefore, it is apparent that the outer wall of the chamber as well as the inner wall of the chamber on the side opposite the light source need not be circular in nature.

With a tubular liquid holder as described herein, the most intensive reflection from the gas-solid interface at the inner chamber wall nearest the light source is approximately at a right angle to the light beam incident on the liquid holder. Accordingly, for optimum response, the sensing means will be placed at about a right angle to the light source. However, the angle between the sensing means and the light source can be acute, subject only to physical space limitations of the detector assembly, or obtuse if the sensing means is adequately shielded from incident light.

A thin film of liquid wetting the chamber surface does not inhibit the desired bright reflection, as the light reflection from a liquid-gas interface is much the same as from a solid-gas interface. In all cases, it is much greater that is obtained from a solid-liquid interface. Therefore, the level of liquids either which wet or do not wet a given transparent fluid holder can be measured by the instant apparatus. It is also evident that the light absorbancy or opacity of a liquid whose level is being measured is not a deterrent to use of this device unless the liquid surface itself is highly reflective, e.g. mercury.

The following examples will serve further to illustrate the invention, but are not to be construed as limiting it thereto.

*Example 1*

Two liquid levels detecting devices of this invention, without light ray scatter control means, each having a photoelectric cell as the photo-sensitive light detecting means were utilized with an Ostwald viscometer. One device was positioned so that the photocell detected light reflected from the inner wall of the capillary of the viscometer at the upper volume indicating mark of the viscometer tube and the other detected light reflected from this wall at the lower volume indicating mark of the viscometer. Each photocell in turn was coupled through an amplifier to a relay through which an electric clock was started by the electrical output as the meniscus of the column passed the upper mark and then stopped as the meniscus passed the lower mark.

The viscometer was mounted in a thermostatically controlled constant temperature both held at 25±0.05° C. to reduce fluctuations from temperature variations in the rate of fluid flow.

Ten water samples were delivered and the times of delivery measured by the liquid level detecting device. These times are presented as follows:

| Sample No: | Time of delivery (seconds) |
| --- | --- |
| 1 | 178.49 |
| 2 | 178.49 |
| 3 | 178.39 |
| 4 | 178.43 |
| 5 | 178.31 |
| 6 | 178.46 |
| 7 | 178.31 |
| 8 | 178.35 |
| 9 | 178.50 |
| 10 | 178.48 |

The average of the ten runs is 178.42 seconds and the maximum deviation from the average is ±0.11 second with the average deviation from the average of the ten runs being 0.065 second.

Both rapid response to fluid flow and high precision are shown by the liquid level detecting device.

*Example 2*

A liquid level detecting device of this invention, as shown in FIGURE 1, was positioned so that the photocell detected light reflected from the inner wall of a 2 cc. pipette at the volume indicating mark at a 2 mm. inside diameter capillary tube above the main fluid holding chamber. The pipette was filled with water by gravity from a reservoir maintained at a hydrostatic head of about 3 feet. The photocell, in turn controlled a solenoid valve which shut off the water supply when activated by the change in reflectivity as the fluid column passed the mark on the pipette.

In a preliminary run, the liquid column rose about 5 mm. in the capillary after it was detected. This corresponded to a change in volume of about 0.016 cc. after detection, which is equivalent to about 0.8 percent of the 2 cc. pipette volume.

Measurement of an amplified voltage gradient output while the liquid level traveled the length of the vertical slit in the member 12 past the photocell, a distance of about 5 mm., indicated a delivered output of about 35 volts. A relay, activated by a voltage gradient of 1–2 volts, was coupled to the photocell and in turn used to activate the solenoid shut-off valve. Subsequent runs with this more sensitive electrical relay system indicated a fluid rise of about 0.2 mm. in the capillary after detection and prior to shut-off of the water flow from the reservoir. This 0.2 mm. column height corresponds to a volume of about 0.0006 cc.

Various modifications can be made in the present invention without departing from the spirit or scope thereof for it is understood that I limit myself only as defined in the appended claims.

I claim:

1. A liquid level detecting device which comprises a light source, a first light ray divergence minimizing means, transparent tubular holder for a liquid, the wall of the liquid holding chamber of said transparent tubular holder facing the light source being curved, a second light ray divergence minimizing means, photo-sensitive means, amplifier, and electrical output reading means, said tubular holder being positioned to receive incident light passed from said light source through said first ray divergence minimizing means, said photo-sensitive means placed at an angle of about 90° from said light source and liquid holder and positioned to receive light reflected from a preselected height on the curved inner wall of said tubular holder facing said light source after said reflected light passes through said second light ray divergence minimizing means, said photo-sensitive means detecting differences in reflectivity of a solid-gas interface and a solid-liquid interface at said preselected height in said tubular holder, said amplifier receiving the electrical output from said photo-sensitive means, and said electrical output reading means sensing variations in electrical output from said amplifier as amplified from variations in reflectivity of said solid-gas and solid-liquid interfaces.

2. A liquid level detecting device as defined in claim 1 wherein said light source is an incandescent bulb and said photo-sensitive means is a photoelectrical cell.

3. A liquid level detecting device as defined in claim 1 wherein the liquid holding chamber of said transparent tubular holder is circular.

References Cited by the Examiner

UNITED STATES PATENTS

| | | |
|---|---|---|
| 1,532,995 | 4/1925 | Gage. |
| 2,240,988 | 5/1941 | Hertel _____ 88—14 X |
| 2,392,951 | 1/1946 | R. G. Salisbury _____ 73—223 |
| 2,490,627 | 12/1949 | Hofberg _____ 73—223 X |
| 2,625,933 | 1/1953 | P. F. Salisbury _____ 73—223 X |

FOREIGN PATENTS 339,976   12/1930   Great Britain.

OTHER REFERENCES

Phillips: "Liquid Sensing Device With No Moving Parts," Product Engineering, June 1952, vol. XXIII, No. 6, pages 134 and 135.

Revere: Engineering Bulletin, No. 1065, four pages, Revere Corporation of America, Wallingford, Connecticut, received U.S. Patent Office, April 29, 1959.

JEWELL H. PEDERSEN, *Primary Examiner.*

C. A. CRETTING, FREDERICK M. STRADER,
*Examiners.*

C. I. McCLELLAND, T. L. HUDSON,
*Assistant Examiners.*